US009392540B2

(12) United States Patent
Jung et al.

(10) Patent No.: US 9,392,540 B2
(45) Date of Patent: Jul. 12, 2016

(54) METHOD FOR REDUCING POWER CONSUMPTION AND ELECTRONIC DEVICE THEREOF (71) Applicant: Samsung Electronics Co., Ltd., Gyeonggi-do (KR)

(72) Inventors: Bu-Seop Jung, Gyeonggi-do (KR); Jun-Ho Lee, Gyeonggi-do (KR); In-Young Hwang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/492,192

(22) Filed: Sep. 22, 2014

(65) Prior Publication Data

US 2015/0099513 A1 Apr. 9, 2015

(30) Foreign Application Priority Data

Oct. 8, 2013 (KR) .................. 10-2013-0120133

(51) Int. Cl.
H04W 4/00 (2009.01)
H04W 48/20 (2009.01)
H04W 8/18 (2009.01)

(52) U.S. Cl.
CPC ............... H04W 48/20 (2013.01); H04W 8/18 (2013.01); Y02B 60/50 (2013.01)

(58) Field of Classification Search
CPC ............................. H04W 48/20; H04W 8/18
USPC ....................................... 455/432.1
See application file for complete search history.

(56) References Cited

U.S. PATENT DOCUMENTS

| 2009/0289601 | A1* | 11/2009 | Kanade | H04W 52/0277 |
| | | | | 320/135 |
| 2012/0032876 | A1 | 2/2012 | Tabe | |
| 2012/0044862 | A1 | 2/2012 | Chen et al. | |
| 2012/0044914 | A1 | 2/2012 | Chen et al. | |
| 2012/0135729 | A1* | 5/2012 | Chiou et al. | 455/434 |
| 2012/0264402 | A1 | 10/2012 | Zhang et al. | |
| 2013/0022024 | A1* | 1/2013 | Chu et al. | 370/332 |
| 2013/0100857 | A1 | 4/2013 | Iyer | |
| 2013/0107706 | A1 | 5/2013 | Raleigh | |
| 2014/0254500 | A1* | 9/2014 | Alavudin | 370/329 |

FOREIGN PATENT DOCUMENTS

JP 2009-219052 A 9/2009
KR 10-2013-0016401 A 2/2013

* cited by examiner

Primary Examiner — Tanmay Shah
(74) Attorney, Agent, or Firm — Cha & Reiter, LLC.

(57) ABSTRACT

Disclosed herein are an electronic device and method for reducing power consumption while roaming. A state of the electronic device is detected. It is determined whether the firmware executes roaming based at least partially on a channel list and a state of the electronic device.

14 Claims, 7 Drawing Sheets

METHOD FOR REDUCING POWER CONSUMPTION AND ELECTRONIC DEVICE THEREOF

CLAIM OF PRIORITY

This application claims the benefit under 35 U.S.C. §119 (a) of a Korean patent application filed in the Korean Intellectual Property Office on Oct. 8, 2013 and assigned Serial No. 10-2013-0120133 the entire disclosure of which is hereby incorporated by reference.

BACKGROUND

1. Field

The present disclosure relates to a method for reducing power consumption and an electronic device thereof.

2. Description of the Related Art

The advancement of communication and semiconductor technologies has resulted in the development of electronic devices that behave as multimedia devices executing various multimedia functions. For example, electronic devices today may provide voice communication services, video communication services, messenger services, broadcasting services, wireless Internet services, camera services, and music playback services.

SUMMARY

Aspects of the present disclosure address at least the above-mentioned problems and/or disadvantages. Even if the communication is finished, the electronic device consumes the current by roaming.

Accordingly, aspects of the present disclosure provide an apparatus and method for minimizing power consumption by roaming using the firmware itself without waking up a host when the firmware determines that the host is in a sleep state.

Other aspects of the present disclosure provide an apparatus and method for ensuring reliability of data by waking up a host before firmware transmits incoming data to the host and transmitting stored roaming connection information to the host.

In accordance with an aspect of the present disclosure, a method in an electronic device is provided. The method may include analyzing, using firmware, a channel list for roaming; detecting, using the firmware, a state of the electronic device; and determining whether the firmware is to execute the roaming based at least partially on the channel list and a state of the electronic device.

In accordance with another aspect of the present disclosure, an electronic device is provided. The electronic device may include at least one processor to: analyze a channel list for roaming; detecting a state of the electronic device; and identify whether to execute the roaming with firmware, based at least partially on the channel list and a state of the electronic device.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Examples of the present disclosure will be described herein with reference to the accompanying drawings. In the following description, well-known functions or configurations are not described in detail since they may obscure the disclosure with unnecessary detail.

In one example, an electronic device may be a device including a communication function. For example, the electronic device may be one or a combination of one or more devices including, but not limited to, a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group (MPEG) layer 3 (MP3) player, a mobile medical device, an electronic bracelet, an electronic necklace, electronic accessories, a camera, a wearable device, an electronic clock, a wristwatch, smart white appliances (e.g., a refrigerator, an air conditioner, a cleaner, a cybot, a TeleVision (TV), a Digital Versatile Disc (DVD) player, an audio, an oven, a microwave oven, a washing machine, an air cleaner, an electronic picture frame, etc.), various medical devices (e.g., a Magnetic Resonance Artery (MRA), a Magnetic Resonance Imaging (MRI), a CT (Computed Tomography), an imaging apparatus, a ultrasonic machine, etc.), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a car infotainment device, electronic equipment for ship (e.g., a navigation device for ship, a gyrocompass, etc.), avionics, a security device, electronic clothes, an electronic key, a camcorder, a game console, a Head Mounted Display (HMD), a flat panel display, an electronic album, a part of furniture or a building/structure including a communication function, an electronic board, an electronic signature receiving device, or a projector. It is understood that the electronic device is not limited to the above-described examples.

Figure 1:
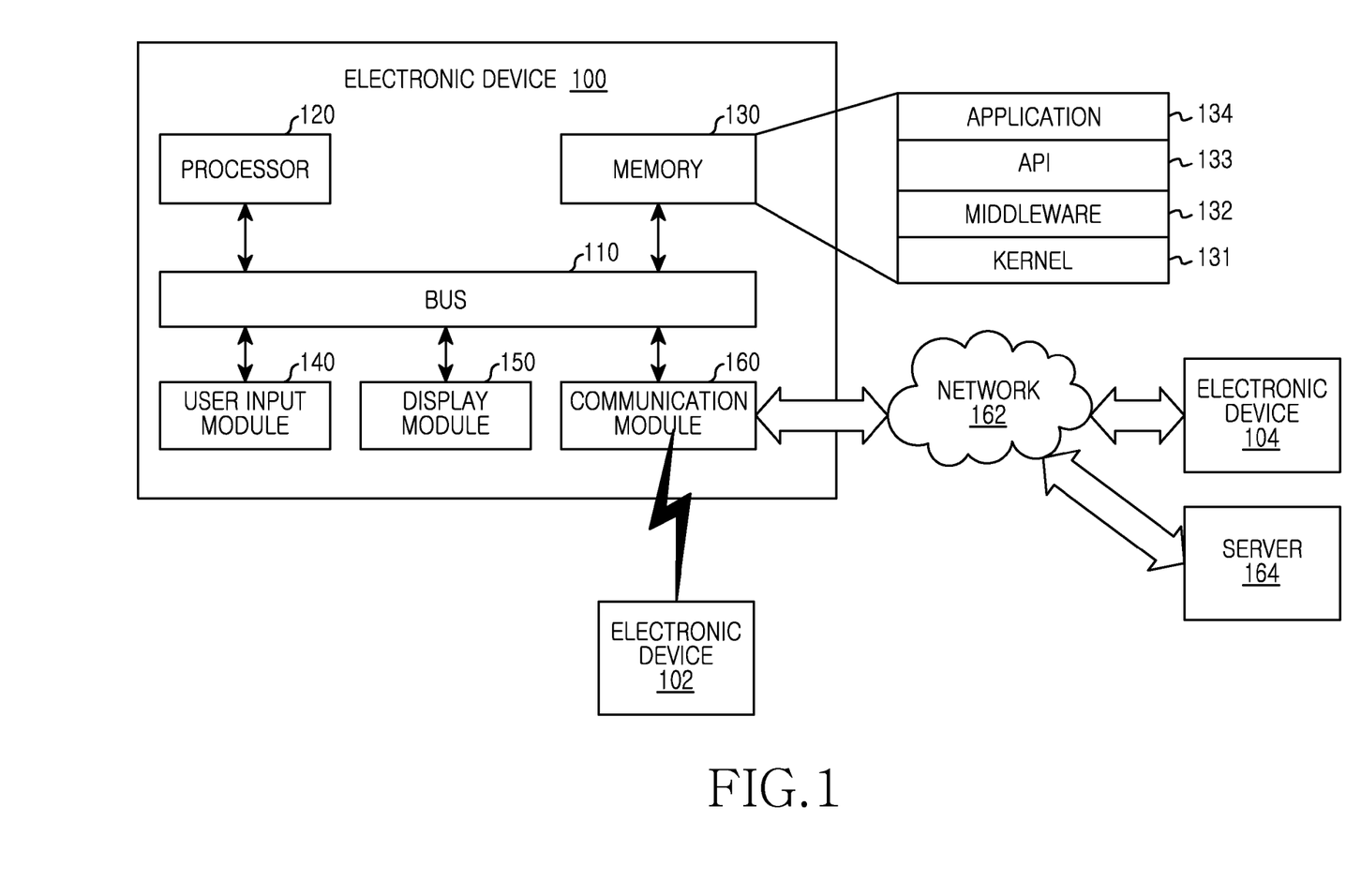
FIG. 1 is a block diagram illustrating an example electronic device configuration in accordance with aspects of the present disclosure.

Referring to FIG. 1, the example electronic device denoted by 100 may include a bus 110, a processor 120, a memory 130, a user input module 140, a display module 150, or a communication module 160. The bus 110 may be a circuit which may connect the above-described components with each other and transmit communication (e.g., a control message) between the components.

The processor 120 may receive, for example, commands from the above-described other components (e.g., the memory 130, the user input module 140, the display module 150, the communication module 160, etc.) through the bus 110, decode the received commands, and perform calculation or data processing in accordance with the decoded commands.

The memory 130 may store commands or data received from the processor 120 or other components (e.g., the user input module 140, the display module 150, the communication module 160, etc.) or are generated by the processor 120 or other components. The memory 130 may include programming modules such as a kernel 131, a middleware 132, an Application Programming Interface (API) 133, or an application 134. Herein, the above-described respective programming modules may be composed of software, firmware, hardware, or combination of at least two or more of them.

The kernel 131 may control or manage system resources (e.g., the bus 110, the processor 120, or the memory 130, etc.) used to execute an operation or function implemented in the other programming modules, for example, the middleware 132, the API 133, or the application 134. Also, the kernel 131 may provide an interface which may access a separate component of the electronic device 100 in the middleware 132, the API 133, or the application 134 and control or manage the separate component.

The middleware 132 may facilitate communication such that the API 133 or the application 134 communicates with the kernel 131 and transmits and receives data using middleware 132. Also, the middleware 132 may perform load balancing for work requests using a method of assigning priority which may use system resources (the bus 110, the processor 120, or the memory 130, etc.) of the electronic device 100 to, for example, at least one of the plurality of applications 134, in association with the work requests received from the plurality of applications 134.

The API 133 may be an interface in which the application 134 may control a function provided from the kernel 131 or the middleware 132. For example, the API 133 may include at least one interface or function for file control, window control, image processing, or text control.

The user input module 140 may receive, for example, commands or data from the user and transmit the received commands or data to the processor 120 or the memory 130 through the bus 110. The display module 150 displays videos, images, or data to the user.

The communication module 160 may perform communication between the electronic device 100 and another electronic device 102. The communication module 160 may support a local-area communication protocol (e.g., Wireless-Fidelity (Wi-Fi), Bluetooth (BT), Near Field Communication (NFC), or certain network communication 162 (e.g., the Internet, a Local Area Network (LAN), a Wide Area Network (WAN), a telecommunication network, a cellular network, a satellite network, or a Plain Old Telephone Service (POTS), etc.). Each of the other electronic devices 102 and 104 may be the same (e.g., the same type) device as the electronic device 100 or a device (e.g., a different type) which is different from the electronic device 100.

Figure 2:
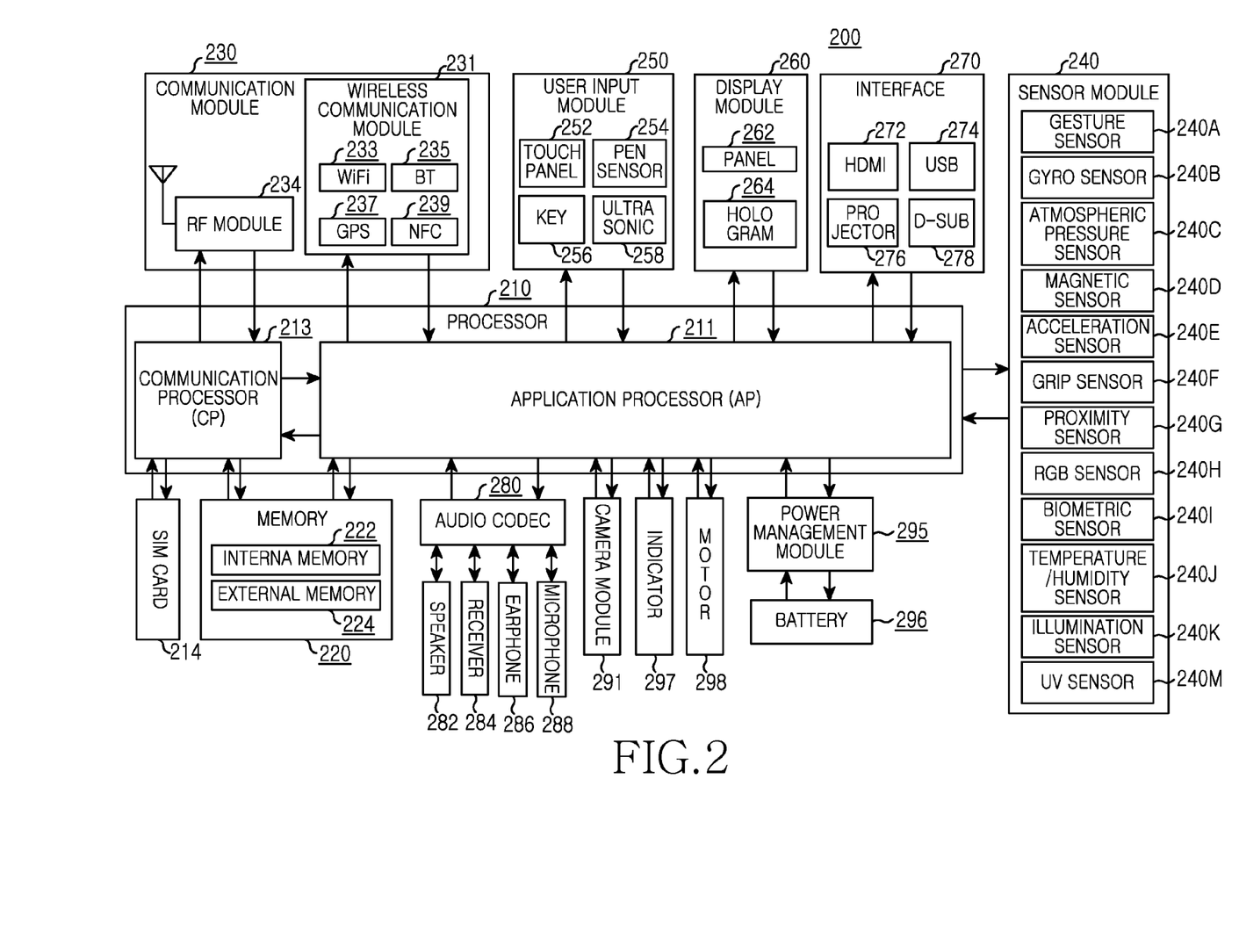
FIG. 2 is a block diagram illustrating an example hardware configuration in accordance with aspects of the present disclosure.

Referring now to FIG. 2, the example hardware denoted by 200 may be, for example, the electronic device 100 shown in FIG. 1. Referring to FIGS. 1 and 2, the hardware 200 may include one or more processors 210, a Subscriber Identity Module (SIM) card 214, a memory 220, a communication module 230, a sensor module 240, a user input module 250, a display module 260, an interface 270, an audio codec 280, a camera module 291, a power management module 295, a battery 296, an indicator 297, or a motor 298.

The processor 210 (e.g., the processor 120) may include one or more Application Processors (APs) 211 or one or more Communication Processors (CPs) 213. The processor 210 may be, for example, the processor 120 shown in FIG. 1. Although the AP 211 and the CP 213 shown in FIG. 2 are shown to be included in the processor 210, they may be included in different IC packages, respectively. In one example, the AP 211 and the CP 213 may be included in one IC package.

The AP 211 may execute an Operating System (OS) or an application program, control a plurality of hardware or software components connected thereto, and process and calculate various data including multimedia data. The AP 211 may be implemented as, for example, System on Chip (SoC). In one example, the processor 210 may further include a Graphic Processing Unit (GPU).

The CP 213 may perform a function for managing a data link in communication between an electronic device (e.g., the electronic device 100) including the hardware 200 with other electronic devices connected with the electronic device through a network and changing a communication protocol. The CP 213 may be implemented as, for example, SoC. In a further example, the CP 213 may perform at least a part of a multimedia control function. The CP 213 may identify and authenticate, for example, a terminal in a communication network using an SIM (e.g., the SIM card 214). Also, the CP 213 may provide services, such as a voice communication service, a video communication service, a text message service, or a packet data service, to a user of the hardware 200.

Also, the CP 213 may control data transmission and reception of the communication module 230. In FIG. 2, components such as the CP 213, the power management module 295, or the memory 220 are shown as components which are separated from the AP 211. However, in a further example, the AP 211 may be implemented to include at least a part (e.g., the CP 213) of the above-described components.

In another example, the AP 211 or the CP 213 may load and process commands or data received from at least one of a non-volatile memory or another component connected thereto to a volatile memory. Also, the AP 211 or the CP 213 may store data which are received from at least one of other components or are generated by at least one of other components in a non-volatile memory.

The SIM card 214 may be a card implementing an SIM. The SIM card 214 may be inserted into a slot formed in a specific position of the electronic device. The SIM card 214 may include unique identification information (e.g., an Integrated Circuit Card IDentity (ICCID)) or subscriber information (e.g., an International Mobile Subscriber Identity (IMSI)).

The memory 220 may include an internal memory 222 or an external memory 224. The memory 220 may be, for example, the memory 130 shown in FIG. 1. The internal memory 222 may include, but is not limited to, at least one of a volatile memory (e.g., a Dynamic Random Access Memory (DRAM), a Static RAM (SRAM), or a Synchronous Dynamic RAM (SDRAM), etc.) or a non-volatile memory (e.g., an One Time Programmable Read Only Memory (OTPROM), a PROM, an erasable PROM (EPROM), an Electrically Erasable PROM (EEPROM), a mask ROM, a flash ROM, a NAND flash memory, or a NOR flash memory, etc.). In yet a further example, the internal memory 222 may have a type of a Solid State Disk (SSD). The external memory 224 may further include, for example, at least one of a Compact Flash (CF) card, a Secure Digital (SD) card, a micro-SD card, a mini-SD card, an extreme Digital (xD) card, or a memory stick, etc.

The communication module 230 may include a wireless communication module 231 or a Radio Frequency (RF) module 234. The communication module 230 may be, for example, the communication module 160 shown in FIG. 1. The wireless communication module 231 may include, for example, a Wi-Fi module 233, a BT module 235, a GPS module 237, or an NFC module 239. For example, the wireless communication module 231 may provide a wireless communication function using RFs. Additionally or alternatively, the wireless communication module 231 may include a network interface (e.g., a LAN card) or a modem, etc. for connecting the hardware 200 with the network (e.g., the Internet, a LAN, a WAN, a telecommunication network, a cellular network, a satellite network, or a POTS, etc.).

The RF module 234 may be in charge of transmitting and receiving data, for example, an RF signal or a called electronic signal. Although it is not shown in FIG. 2, the RF module 234 may include, for example, a transceiver, a Power Amplifier Module (PAM), a frequency filter, or a Low Noise Amplifier (LNA), etc. Also, the RF module 234 may further include components, for example, conductors or conducting wires, for transmitting and receiving electromagnetic waves on a free space in wireless communication.

The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a Red, Green, and Blue (RGB) sensor 240H, a bio-sensor 240I, a temperature/humidity sensor 240J, an illumination sensor 240K, or a Ultra Violet (UV) sensor 240M. Also, the sensor module 240 may measure a physical quantity or sense an operation state of the electronic device, and convert the measured or sensed information into an electric signal. Additionally or alternatively, the sensor module 240 may include, for example, an Electronic-noise (E-nose) sensor (not shown), an ElectroMyoGraphy (EMG) sensor (not shown), an ElectroEncephaloGram (EEG) sensor (not shown), an ElectroCardioGram (ECG) sensor (not shown), or a fingerprint sensor (not shown), etc. The sensor module 240 may further include a control circuit for controlling at least one or more sensors included therein.

The user input module 250 may include a touch panel 252, a (digital) pen sensor 254, a key 256, or an ultrasonic input device 258. The user input module 250 may be, for example, the user input module 140 shown in FIG. 1. The touch panel 252 may recognize touch input by, for example, at least one of a capacitive type, a resistive type, an infrared type, or an ultrasonic type. Also, the touch panel 252 may further include a controller (not shown). In case of the capacity type, the touch panel 252 may recognize not only direct touch input but also proximity touch input. The touch panel 252 may further include a tactile layer. In this case, the touch panel 252 may provide a tactile response to the user.

The (digital) pen sensor 254 may be implemented, for example, using the same or similar method as or to a method of receiving touch input of the user or using a separate sheet for recognition. The key 256 may be, for example, a keypad or a touch key. The ultrasonic input device 258 is a device which may sense sound waves using a microphone (e.g., the microphone 288) and verify data in the electronic device through a pen which generates ultrasonic waves. The ultrasonic input device 258 may perform wireless recognition. In one example, the hardware 200 may receive input of the user from an external device (e.g., the network 162 of FIG. 1, a computer, or the server 164 of FIG. 1) connected with the communication module 230 using the communication module 230.

The display module 260 may include a panel 262 or a hologram 264. The display module 260 may be, for example, the display module 150 shown in FIG. 1. The panel 262 may be, for example, a Liquid Crystal Display (LCD) or an Active Matrix-Organic Light-Emitting Diode (AM-OLED), etc. Also, the panel 262 may be implemented to be, for example, flexible, transparent, or wearable. The panel 262 and the touch panel 252 may be integrated with each other to constitute one module. The hologram 264 shows stereoscopic images on the air using interference of light. In a further example, the display module 260 may further include a control circuit for controlling the panel 262 or the hologram 264.

The interface 270 may include a High Definition Multimedia Interface (HDMI) 272, a Universal Serial Bus (USB) interface 274, a projector 276, or a D-sub (subminiature) interface 278. Additionally or alternatively, the interface 270 may include, for example, a Secure Digital/MultiMedia Card (SD/MMC) interface (not shown) or an Infrared Data Association (IrDA) interface (not shown).

The audio codec 280 may convert voices and electronic signals in a two-way direction. The audio codec 280 may convert, for example, voice information input or output through a speaker 282, a receiver 284, an earphone 286, or the microphone 288.

The camera module 291 may be a device which may capture images and videos. In another example, the camera module 291 may include, for example, one or more image sensors (e.g., a front lens or a rear lens) (not shown), an Image Signal Processor (ISP) (not shown), or a flash LED (not shown).

The power management module 295 may manage power of the hardware 200. Although it is not shown in FIG. 2, the power management module 295 may include, for example, a Power Management Integrated Circuit (PMIC), a charger IC, or a battery fuel gauge.

The PMIC may be mounted in, for example, an IC or an SoC semiconductor. A charging method of the power management module 295 may be classified into a wire charging method or a wireless charging method. The charger IC may charge a battery and prevent inflow of overvoltage or overcurrent from a charger. In a further example, the charger IC may include a charger IC for at least one of the wire charging method or the wireless charging method. The wireless charging method is, for example, a magnetic resonance method, a magnetic induction method, or an electromagnetic wave method. In the wireless charging method, additional circuits, for example, a coil loop, a resonance circuit, a rectifier, etc. for wireless charging may be added.

The battery fuel gauge may measure, for example, the remaining capacity of the battery 296, voltage in charging, current, or a temperature. The battery 296 may generate electricity and supply power. For example, the battery 296 may be a rechargeable battery.

The indicator 297 may indicate a specific state, for example, a booting state, a message state, or a charging state, etc. of the hardware 200 or a part of the hardware (e.g., the AP 211). The motor 298 may convert an electric signal into a mechanical vibration. A Micro Control Unit (MCU) may control the sensor module 240.

Although it is not shown in FIG. 2, the hardware 200 may further include a processing device (e.g., a GPU) for supporting a mobile TV. The processing device for supporting the mobile TV may process media data in accordance with, for example, the standard of Digital Multimedia Broadcasting (DMB), Digital Video Broadcasting (DVB), or media flow.

Names of the above-described hardware components may differ in different kinds of electronic devices. The hardware may be configured to include at least one of the above-described components. Some components of the hardware may be omitted or the hardware may further include other additional components. Also, in another example, some of the components of the hardware may be combined and configured as one entity. Therefore, the one device may equally perform functions of the corresponding components before some of the components are combined.

Figure 3:
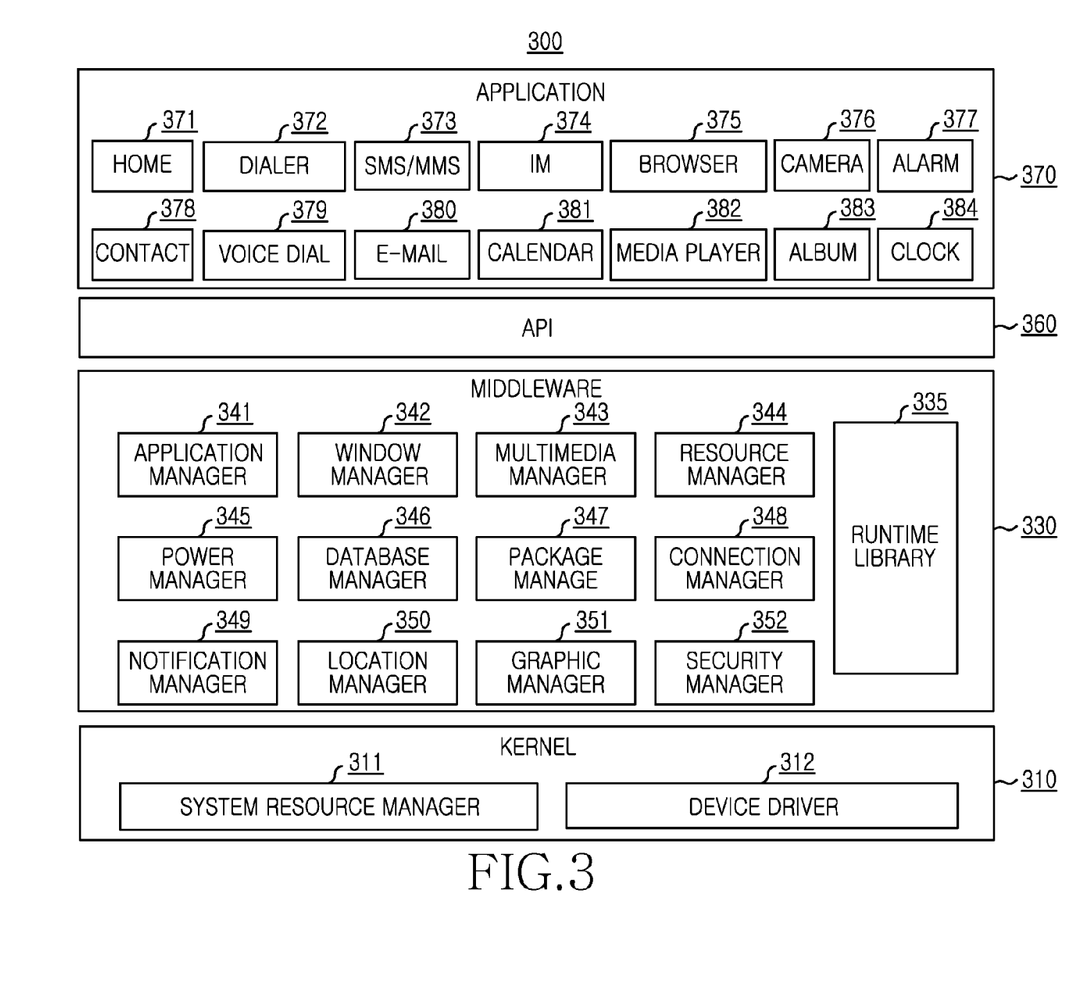
FIG. 3 is a block diagram illustrating an example configuration of a programming framework in accordance with aspects of the present disclosure.

Referring now to FIG. 3, the example programming framework denoted by 300 may be included (e.g., stored) in the electronic device 100 (e.g., the memory 130) shown in FIG. 1. At least a part of the programming module 300 may be configured by software, firmware, hardware, or combination of two or more of them. The programming module 300 may include an OS which is implemented in hardware (e.g., the hardware 200 of FIG. 2) and controls resources related to an electronic device (e.g., the electronic device 100) or a plurality of applications (e.g., an application 370) executed in the OS which may include a home 371, dialer 372, SMS/MMS 373, IM 374, browser 375, camera 376, alarm 377, contact 378, voice dial 379, e-mail 380, calendar 381, media player 382, album 383 and clock 384. For example, the OS may be Android, iOS, Windows, Symbian, Tizen, or Bada, etc. Referring to FIGS. 1, 2, and 3, the programming module 300 may include a kernel 310, middleware 330, an API 360, or the application 370.

The kernel 310 (e.g., the kernel 131) may include a system resource manager 311 or a device driver 312. The system resource manager 311 may include, for example, a process management unit, a memory management unit, or a file system management unit, etc. The system resource manager 311 may control, assign, or collect, etc. system resources. The device driver 312 may include, for example, a display driver, a camera driver, a Bluetooth driver, a shared memory driver, a USB driver, a keypad driver, a Wi-Fi driver, or an audio driver. Also, in a further example, the device driver 312 may include an Inter-Process Communication (IPC) driver (not shown).

The middleware 330 may include a plurality of modules which are previously implemented to provide functions the application 370 needs in common. Also, the middleware 330 may provide functions through the API 360 such that the application 370 uses limited system resources in the electronic device efficiently. For example, as shown in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler to add a new function through a programming language while the application 370 is executed. In one example, the runtime library 335 may perform a function for input and output, memory management, or an arithmetic function.

The application manager 341 may manage, for example, a life cycle of at least one of the applications 370. The window manager 342 may manage Graphic User Interface (GUI) resources used on a screen of the electronic device. The multimedia manager 343 may ascertain a format necessary for reproducing various media files and encode or decode a media file using a codec corresponding to the corresponding format. The resource manager 344 may manage source codes of at least one of the applications 370, and manage resources of a memory or storage.

The power manager 345 may act with a Basic Input Output System (BIOS), manage a battery or a power source, and provide power information necessary for an operation. The database manager 346 may perform a management operation to generate, search, or change a database to be used in at least one of the applications 370. The package manager 347 may manage installation or update of an application distributed by a type of a package file.

The connectivity manager 348 may manage, for example, wireless connection such as Wi-Fi or BT, etc. The notification manager 349 may display or notify events such as an arrival message, an appointment, and proximity notification by a method which is not disturbed to the user. The location manager 350 may manage location information of the electronic device. The graphic manager 351 may manage a graphic effect to be provided to the user or a UI related to the graphic effect. The security manager 352 may provide all security functions necessary for system security or user authentication, etc. In one example, when the electronic device (e.g., the electronic device 100) has a phone function, the middleware 330 may further include a telephony manager (not shown) for managing a voice or video communication function of the electronic device.

The middleware 330 may generate and use a new middleware module through combination of various functions of the above-described internal component modules. The middleware 330 may provide a module which specializes while being classified in accordance with a kind of OS to provide a differentiated function. Also, the middleware 330 may dynamically delete some of old components or add new components. Also, some of components described in the present disclosure may be omitted, other components may be further added, or components having different names for performing similar functions may be replaced.

The API 360 (e.g., the API 133) as a set of API programming functions may be provided as different components in accordance with the OS. For example, in case of Android or iOS, one API set may be provided while being classified according to platforms. In case of Tizen, for example, two or more API sets may be provided.

The application 370 (e.g., the application 134) may include, for example, a preload application or a third party application.

At least a part of the programming module 300 may be implemented as instructions stored in non-transitory computer-readable media. When the instructions are executed by one or more processors, for example, the processor 210, the one or more processors may perform functions corresponding to the instructions. The non-transitory computer-readable storage media may be, for example, the memory 220. At least a part of the programming module 300 may be, for example, implemented (e.g., executed) by the processor 210. At least a part of the programming module 300 may include, for example, a module, a program, a routine, a set of instructions, or a process, etc., for performing one or more functions.

Names of the components of the programming module (e.g., the programming module 300) may differ in accordance with differences in the OS. Also, in one example, the programming module may include at least one or more of components. Some of the components may be omitted. The programming module may further include additional other components.

Figure 4:
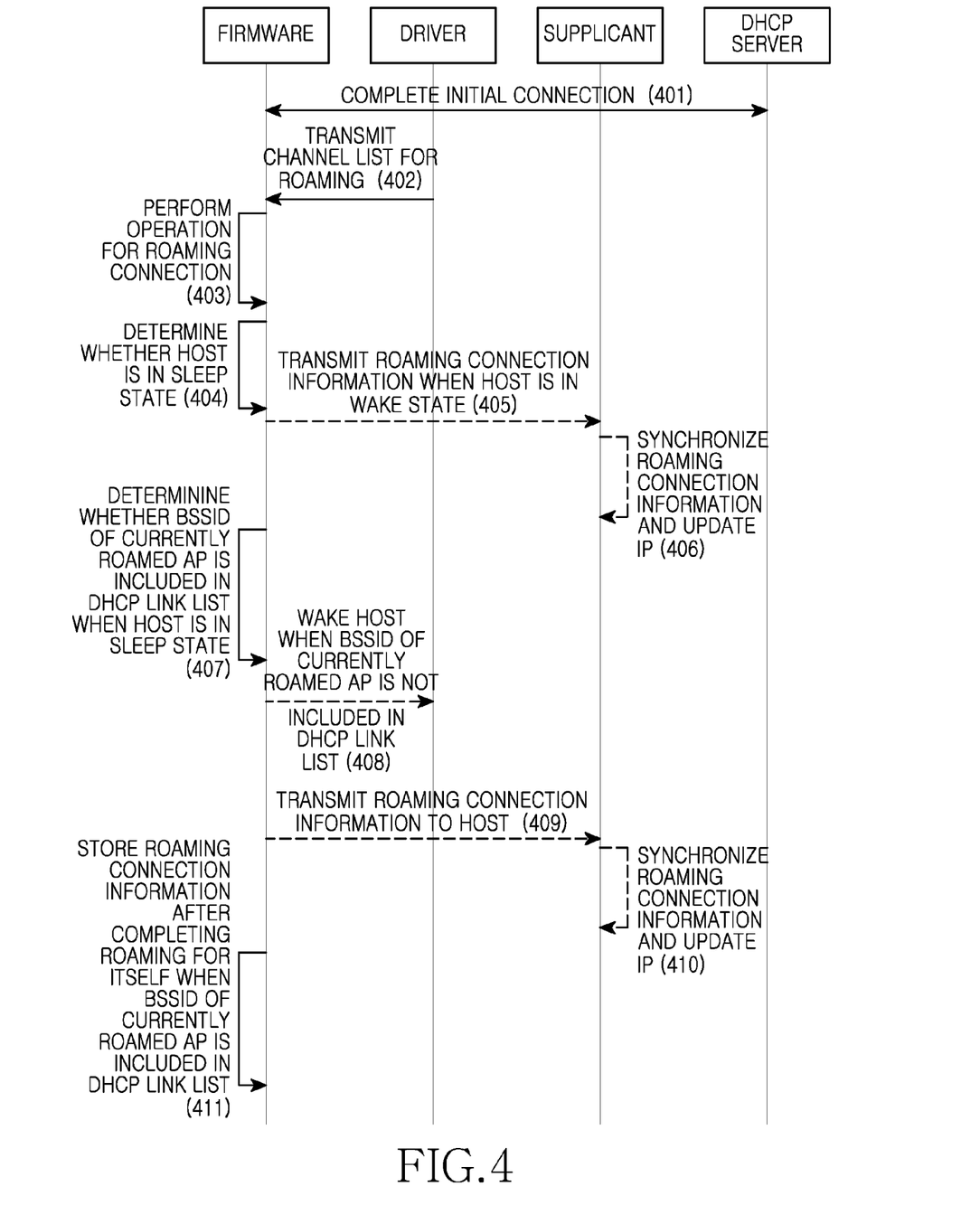
FIG. 4 is a signal sequence diagram illustrating a working example of firmware in communication with a device in accordance with aspects of the present disclosure.

Referring now to FIG. 4, an example electronic device may complete initial connection with a Dynamic Host Configuration Protocol (DHCP) server (block 401). In particular, the electronic device may establish an initial connection with the DHCP server located in the same sub-net.

Thereafter, a driver included in the electronic device may transmit a channel list for roaming to the firmware (block 402). Although it is not shown in FIG. 4, the driver or a supplicant of the electronic device may transmit a key value, such as a Pairwise Master Key (PMK) and a DHCP link list which are acquired in initial connection, to the firmware. Also, the supplicant included in the electronic device may transmit a Basic Service Set Identifier (BSSID) list of an Access Point (AP) which shares the DHCP server currently connected with the electronic device. Also, when an update of the DHCP link list is generated after transmitting the DHCP link list to the firmware, the supplicant included in the electronic device may transmit the updated DHCP link list to the firmware periodically.

The firmware included in the electronic device may perform a roaming connection (block 403). In particular, while the firmware monitors a Received Signal Strength Indication (RSSI) and a beacon periodically, an authenticator included in the firmware may perform an authenticator operation for a roaming connection, an association operation, and a 4-way handshaking operation.

The firmware included in the electronic device may identify whether a host is in a sleep state (block 404). In particular, the firmware may determine whether the host or electronic device, including the driver, the supplicant, etc., is in the sleep state.

If the host is in a wake state, the firmware may transmit roaming connection information to the host (block 405). In one example, when the host is in the wake state, the firmware may transmit the roaming connection information to the supplicant. No current is necessary for waking the electronic device, since it is already in the wake state.

The supplicant included in the electronic device may synchronize the roaming connection information and update an Information Provider (IP) (block 406). In particular, the supplicant may receive roaming connection information from the firmware, synchronize the roaming connection information, and update an IP.

If it is determined that the host is in the sleep state in block 404, the firmware may determine whether a BSSID of a currently roamed AP is included in the DHCP link list (block 407). That is, in order to determine whether the firmware is to execute the roaming, the firmware may determine whether the BSSID of the currently roamed AP is included in the DHCP link list.

If it is determined that the BSSID of the currently roamed AP is not included in the DHCP link list in block 407, the firmware may wake the host (block 408). Because a DHCP differs, when the BSSID of the currently roamed AP is not included in the DHCP link list, the firmware wakes the host and the supplicant of the electronic device updates the IP.

The firmware may transmit the roaming connection information to the host (block 409). In one example, the firmware may transmit the roaming connection information to the supplicant such that the supplicant may synchronize the roaming connection information and update an IP (block 410).

If it is determined that the BSSID of the currently roamed AP is included in the DHCP link list in block 407, the firmware may store the roaming connection information after completing the roaming operation (block 411).

Figure 5:
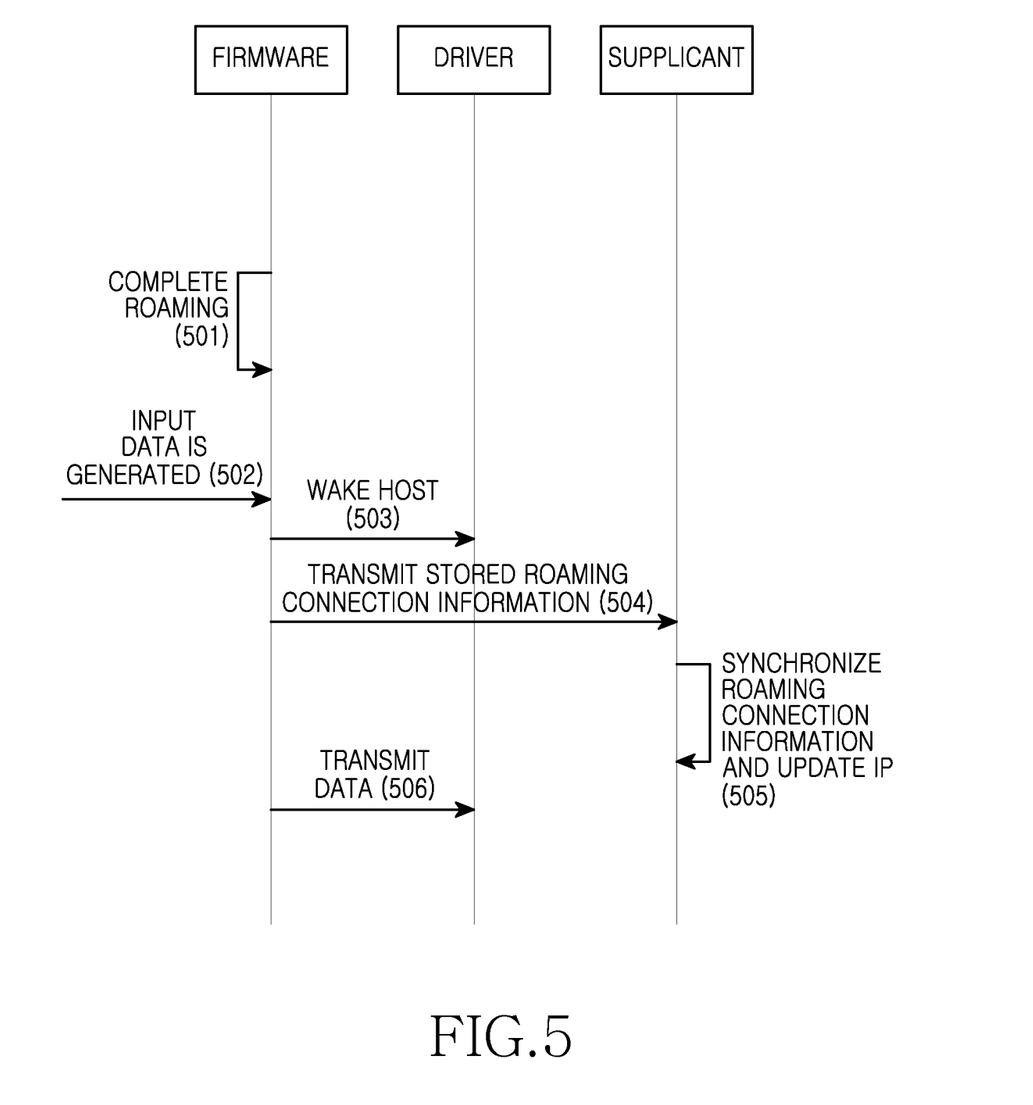
FIG. 5 is a signal sequence diagram illustrating a working example of ensuring reliability of data in accordance with aspects of the present disclosure.

Referring now to FIG. 5, firmware included in the electronic device may complete the roaming (block 501). In particular, when it is determined that an operation state of the electronic device is in a sleep state, the firmware may store roaming connection information after roaming.

The firmware included in the electronic device may verify that incoming data is generated (block 502). For example, after the firmware completes the roaming, the electronic device may verify that the incoming data is generated (e.g., a voice call, etc. from another electronic device).

The firmware included in the electronic device may wake the host (block 503). In one example, the firmware may wake the electronic device before the input data is transmitted to the supplicant. Furthermore, the firmware included in the electronic device may transmit stored roaming connection information to the host (block 504). In particular, the firmware may transmit the latest connection information stored through the roaming it performed to the supplicant of the electronic device. In turn, the supplicant may synchronize the roaming connection information and update an IP (block 505). That is, the supplicant may receive the roaming connection information from the firmware, synchronize the roaming connection information before data communication, and update the IP.

Thereafter, the firmware included in the electronic device may transmit the incoming data to a driver of the electronic device (block 506). In turn, the electronic device may synchronize the roaming connection information and receive a call from another electronic device using the updated IP.

Figure 6:
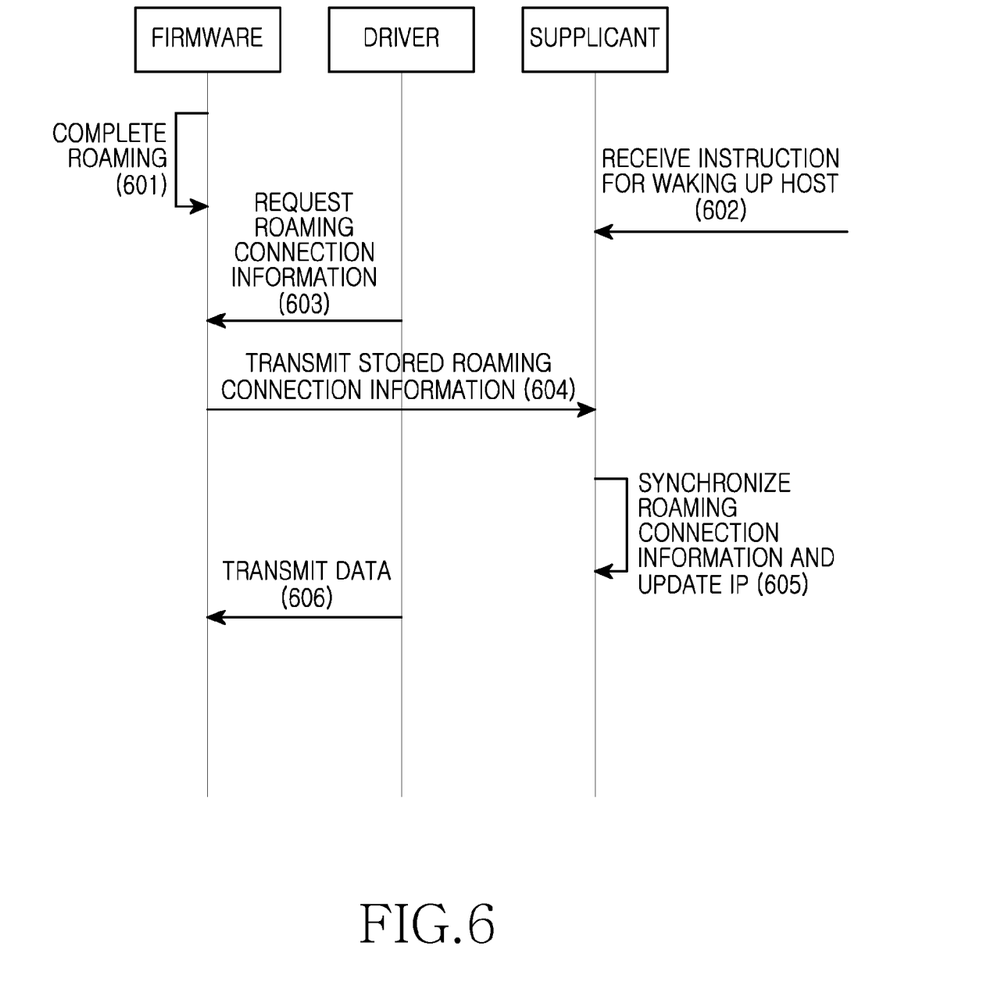
FIG. 6 is a signal sequence diagram illustrating a further working example of ensuring reliability of data in accordance with aspects of the present disclosure.

Referring now to FIG. 6, firmware included in the electronic device may complete the roaming (block 601). In particular, when it is determined that the electronic device is in a sleep state, the firmware may store roaming connection information after completing the roaming.

Thereafter, the electronic device may receive an instruction to wake (block 602). For example, after the firmware completes the roaming, the electronic device may receive the instruction to wake from a user.

A driver of the electronic device may request the firmware to transmit roaming connection information (block 603). The firmware included in the electronic device may transmit the stored roaming connection information to the supplicant (block 604). In turn, the supplicant included in the electronic device may synchronize the roaming connection information and update an IP (block 605). That is, the supplicant may receive the roaming connection information from the firmware, synchronize the roaming connection information before data communication, and update the IP. Furthermore, the driver included in the electronic device may transmit input data to the firmware (block 606).

Figure 7:
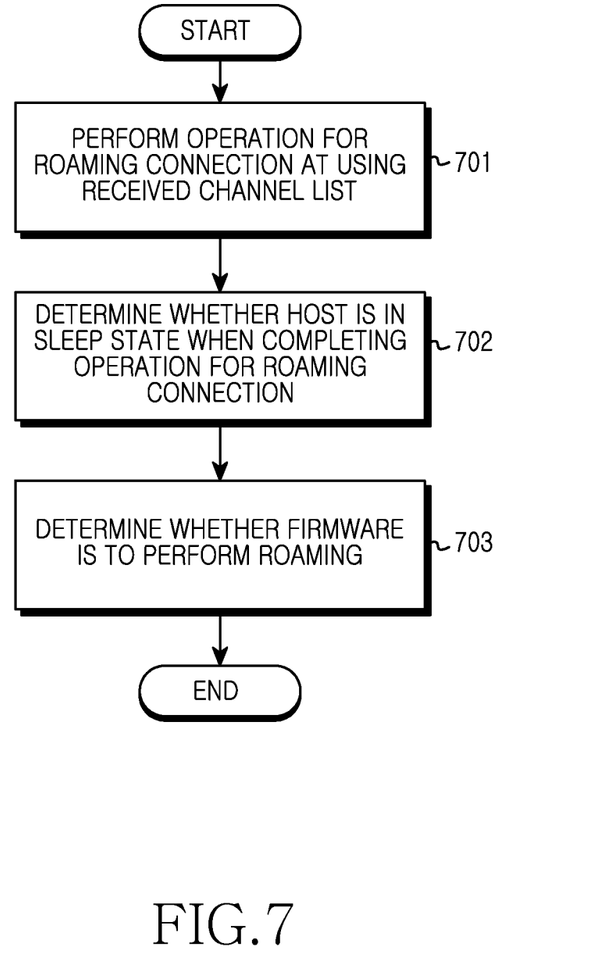
FIG. 7 is a flowchart illustrating an example method of an electronic device in accordance with aspects of the present disclosure.

Referring now to FIG. 7, firmware of the electronic device may perform an operation for roaming using a channel list received by the electronic device (block 701). The firmware may analyze the channel list received by the electronic device and carry out the roaming. In one example, while the firmware monitors an RSSI and a beacon periodically, an authenticator included in the firmware may perform an authenticator operation for roaming connection, an association operation, and a 4-way handshaking operation.

Furthermore, the firmware of the electronic device may determine whether the electronic device is in a sleep state (block 702). That is, the firmware included in the electronic device may determine whether to perform the roaming connection, when the host is in the sleep state, instead of other components in the electronic device.

Thereafter, the firmware of the electronic device may determine whether it is to perform the roaming based at least partially on a state of the host (block 703).

If the host is in a wake state, the firmware may transmit roaming connection information to the supplicant. In addition, the supplicant included in the electronic device may synchronize the roaming connection information and update an IP.

The firmware may determining that the host is in the sleep state by determining whether a BSSID of a currently roamed AP is included in a DHCP link list. When the BSSID of the currently roamed AP is not included in the DHCP link list, the firmware may wake the host. Since the DHCP differs, the firmware wakes the device and the device proceeds to IP update. When the BSSID of the currently roamed AP is included in the DHCP link list, the firmware may store the roaming connection information after the firmware completes the roaming.

The above-described examples of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101. The functions and process steps herein may be performed automatically or wholly or partially in response to user command. An activity (including a step) performed automatically is performed in response to executable instruction or device operation without user direct initiation of the activity.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

What is claimed is:

1. A method in an electronic device, the method comprising:
    analyzing, using firmware, a channel list for roaming;
    detecting, using the firmware, a state of the electronic device;
    determining whether the firmware is to execute the roaming based on the channel list and the state of the electronic device, wherein the channel list is a DHCP link;
    determining whether a BSSID of a currently roamed AP is included in the DHCP link list when it is determined that the firmware is to execute the roaming;
    completing, using the firmware, the roaming when it is determined that the BSSID of the currently roamed AP is included in the DHCP link list; and
    storing information related to the roaming connection in the firmware.

2. The method of claim 1, wherein the roaming comprises an authenticator operation, an association operation, and a 4-way handshaking operation.

3. The method of claim 1, wherein the firmware executes the roaming when the electronic device is in a sleep state.

4. The method of claim 1, further comprising:
    verifying that roaming connection information is transmitted to a supplicant, when it is determined that the electronic device is in a wake state; and
    synchronizing, using the supplicant, the roaming connection information and updating an information provider.

5. The method of claim 1, further comprising:
    verifying, using the firmware, that incoming data is received;
    waking up, using the firmware, the electronic device;
    verifying, using the firmware, that the roaming connection information is transmitted to a supplicant;
    synchronizing, using the supplicant, the roaming connection information; and
    updating, using the supplicant, an information provider.

6. The method of claim 5, wherein the incoming data is at least one of an instruction for receiving a voice call and an instruction for waking up the electronic device.

7. The method of claim 1, further comprising:
    determining whether a BSSID of a currently roamed AP is included in a DHCP link list, when it is determined that the firmware is to execute the roaming;
    waking up the electronic device, using the firmware, when it is determined that the BSSID of the currently roamed AP is not included in the DHCP link list;
    verifying, using the firmware, that roaming connection information is transmitted to a supplicant; and
    synchronizing, using the supplicant, the roaming connection information; and updating, using the supplicant, an information provider.

8. An electronic device comprising:
    at least one processor to:
        analyze a channel list for roaming;
        detecting a state of the electronic device;
        identify whether to execute the roaming with firmware, based on the channel list and the state of the electronic device, wherein the channel list is a DHCP link;
        determine whether a BSSID of a currently roamed AP is included in the DHCP link list when it is determined that the firmware is to execute the roaming;
        complete, using the firmware, the roaming when it is determined that the BSSID of the currently roamed AP is included in the DHCP link list; and
        store information related to the roaming connection in the firmware.

9. The electronic device of claim 8, wherein the roaming comprises an authenticator operation, an association operation, and a 4-way handshaking operation.

10. The electronic device of claim 8, wherein the at least one processor to execute the roaming with the firmware, when the electronic device is in a sleep state.

11. The electronic device of claim 8, wherein the at least one processor to:
   verify that roaming connection information is transmitted to a supplicant, when it is determined that the electronic device is in a wake state; and
   synchronize, using the supplicant, roaming connection information and updating an information provider.

12. The electronic device of claim wherein the at least one processor to
   verify, using the firmware, that incoming data is received;
   wake up, using the firmware, the electronic device;
   verify, using the firmware, that roaming connection information is transmitted to a supplicant;
   synchronize, using the supplicant, roaming connection information; and
   update, using the supplicant, an information provider.

13. The electronic device of claim 12, wherein the incoming data is at least one of an instruction for receiving a voice call and an instruction for waking up the electronic device.

14. The electronic device of claim 8, wherein the at least one processor to:
   determine whether a BSSID of a currently roamed AP is included in a DHCP link list, when it is determined that the firmware is to execute the roaming;
   wake up the electronic device, using the firmware, when it is determined that the BSSID of the currently roamed AP is not included in the DHCP link list;
   verify, using the firmware, that roaming connection information is transmitted to a supplicant at the firmware;
   synchronize, using the supplicant, roaming connection information; and
   update, using the supplicant, an information provider.

* * * * *